(12) United States Patent
Daumont et al.

(10) Patent No.: US 7,866,740 B2
(45) Date of Patent: Jan. 11, 2011

(54) ROOF FRAME AND COVER SYSTEM FOR RECREATIONAL VEHICLES

(75) Inventors: Harold A. Daumont, Terrace (CA); Wade H. Muchowski, Terrace (CA)

(73) Assignee: Easy RV Storage Systems Inc., Terrace (CA)

( * ) Notice: Subject to any disclaimer, the term of this patent is extended or adjusted under 35 U.S.C. 154(b) by 0 days.

(21) Appl. No.: 12/564,861

(22) Filed: Sep. 22, 2009

(65) Prior Publication Data
US 2010/0300014 A1 Dec. 2, 2010

(30) Foreign Application Priority Data
May 27, 2009 (CA) .................................. 2666938

(51) Int. Cl.
*B60R 9/04* (2006.01)
(52) U.S. Cl. .................... 296/210; 296/164; 296/136.12
(58) Field of Classification Search ................. 296/210, 296/156, 160, 164, 102, 136.01, 136.12
See application file for complete search history.

(56) References Cited

U.S. PATENT DOCUMENTS

| | | | |
|---|---|---|---|
| 3,454,020 A | 7/1969 | Grossman | |
| 3,952,758 A | 4/1976 | Addison et al. | |
| 3,955,731 A * | 5/1976 | Lindelef et al. | 224/328 |
| 5,368,056 A | 11/1994 | Riggi, Jr. | |
| 5,493,818 A | 2/1996 | Wilson | |
| 5,700,048 A * | 12/1997 | Wade et al. | 296/163 |
| 6,257,259 B1 | 7/2001 | Ardouin | |
| 6,659,530 B1 | 12/2003 | Jones | |
| 6,923,498 B1 | 8/2005 | Mecham | |
| 2009/0038766 A1 | 2/2009 | Smith, Jr. | |

FOREIGN PATENT DOCUMENTS

| | | |
|---|---|---|
| CA | 2081968 | 5/1994 |
| CA | 2104572 | 2/1995 |
| GB | 2454061 A | 4/2009 |

* cited by examiner

*Primary Examiner*—Joseph D Pape
(74) *Attorney, Agent, or Firm*—Oyen Wiggs Green & Mutala LLP

(57) ABSTRACT

An RV roof frame and cover system protects an RV during storage. The system comprises a roof frame and a cover. The frame has a ridge pole member having two sets of rafter members extending downwardly therefrom. The rafter members are attached at their lower ends to one of two horizontal members which can be moved towards and apart from one another to adjust the width of the frame. The rafter members are rotatably attached to both the ridge pole member and the lower horizontal member. The horizontal members are tied to one another by tie beam members which have an adjustable length to accommodate the movement of the horizontal members towards and away from one another. The tie beam members may be provided on legs which extend downwardly from the horizontal members.

18 Claims, 5 Drawing Sheets

ROOF FRAME AND COVER SYSTEM FOR RECREATIONAL VEHICLES

TECHNICAL FIELD

This present invention relates to protective covers for vehicles such as recreational vehicles and more particularly to an adjustable frame for mounting atop a recreational vehicle and a cover for covering the frame and vehicle.

BACKGROUND

Protective covers for vehicles are well known and in particular, many cover systems for recreational vehicles ("RV's") such as camper trailers, $5^{th}$-wheel trailers and motor homes have been proposed. These covers are intended to protect the RV, particularly during storage and particularly during storage in the off-season (during the winter, for example). In many instances, RV's must be stored out-of-doors and are exposed to rain and snow. In areas where snowfall is heavy, it is not unusual for an RV owner to have to clear the roof of the RV of snow periodically to prevent damage to the roof from heavy snow, since the RV's generally have flat roofs on which the snow accumulates. In some cases, an RV roof can cave-in from heavy snow.

Some examples of previously-proposed covers are to be found in U.S. Pat. Nos. 6,923,498 and 6,659,530. Canadian patent application No. 2,104,572, filed 20 Aug. 1993 and published 21 Feb. 1995 also shows a "secondary roof system" for an RV.

All of the previously-proposed systems have disadvantages. Many are cumbersome to install. Many are heavy. Many are not easily adjusted to fit RV's of different dimensions. There remains a need for an effective roof frame and cover system for RV's which provides a peaked roof to avoid snow and water accumulation.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In its most basic form, the roof frame of the present invention has a ridge pole member, and two pluralities of rafter members rotatably mounted on the ridge pole member at a first end and extending downwardly and outwardly from the ridge pole member. Each set of rafter members is attached at a second end to a horizontal pole member. The first and second horizontal pole members are attached together with one or more tie beam pole members having an adjustable length.

In one embodiment, leg members extend downwardly from the horizontal pole members and the tie beam pole members extend from one leg on one horizontal pole member to another leg on the opposite horizontal pole member. The legs may have flanges to more securely mount the apparatus onto the roof of an RV.

One way in which the various pole-like members may be rotatably attached to one another is by means of a lateral cylindrical sleeve attached by way of a collar at each end of the member, the sleeve adapted to be mountable onto the relevant member.

The cover system of the invention includes the roof frame described herein and a cover adapted to be placed over the roof frame and the RV once the roof frame has been placed into position on the RV. The cover may be provided with zippers and straps to assist in installation of the cover, and other zippers may also be provided to allow access into the RV without having to remove the cover.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
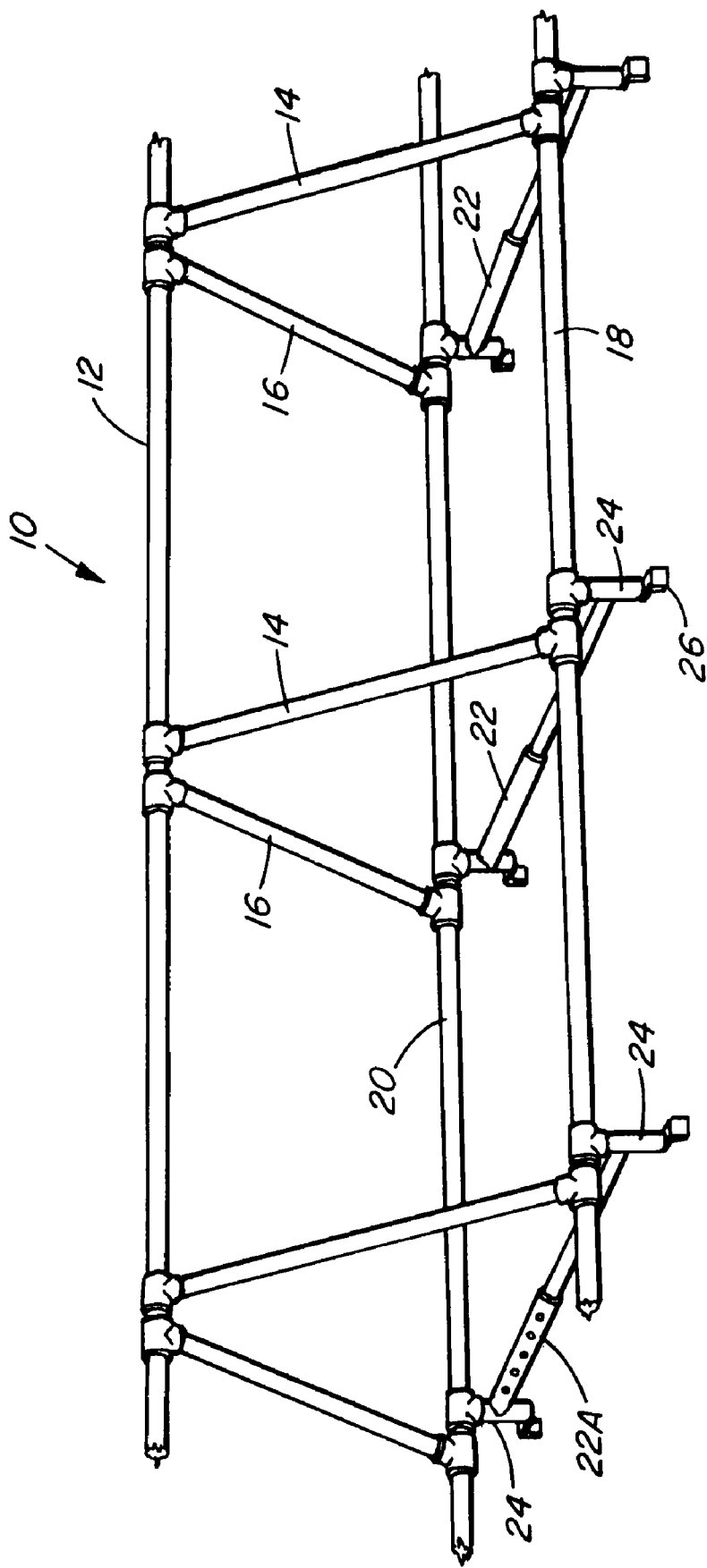
FIG. 1 is a perspective view of a portion of a roof frame made in accordance with one embodiment of the invention.

As shown in FIG. 1, a roof frame for mounting on the top of an RV is denoted generally by the numeral 10. Frame 10 has a ridge pole member 12. Extending downwardly from ridge pole member 12 is a first plurality of rafter members 14. In a laterally-opposite direction, a second plurality of rafter members 16 also extends downwardly from ridge pole member 12. The ridge pole member 12 and the rafter members 14, 16 thus form the general familiar shape of a roof. Ridge pole member 12 and rafter members 14, 16 may be of any suitable configuration but most conveniently are round poles. The rafter members 14, 16 are each rotatably attached to the ridge pole member 12 as discussed further below, allowing them to rotate generally about the axis of ridge pole member 12.

At their bottom ends, the first plurality of rafter members 14 are each rotatably attached to a first horizontal pole member 18. Similarly, at their bottom ends the second plurality of rafter members 16 are each rotatably attached to a second horizontal pole member 20. Preferably for most applications, horizontal pole members 18, 20 and ridge pole member 12 will all be parallel with one another.

The first and second horizontal pole members 18, 20 are attached together at least one point along their respective lengths, preferably with one or more tie beam pole members 22 having an adjustable length. In a preferred version of the invention, legs 24 are attached to the horizontal pole members 18, 20 and the tie beam pole members 22 extend laterally from a leg on horizontal pole member 18 to a leg on horizontal pole member 20, as shown in FIG. 1, although legs 24 are not necessarily essential to the invention and tie beam pole members 22 can be attached directly to each of the two horizontal pole members.

To achieve adjustability in their length, tie beam pole members 22 are conveniently formed of two or more telescoping poles as shown in FIG. 1. The length of pole members 22 may be fixed at a desired length in any suitable fashion, for example by means of a familiar push-button and hole fastening configuration (shown as 22A in FIG. 1) wherein the length of tie beam pole members 22 can be fixed at various predetermined increments.

The length of tie beam pole members 22 is adjustable to allow the width of frame 10 to be adjusted for mounting on top of RV's of different widths.

Figure 3:
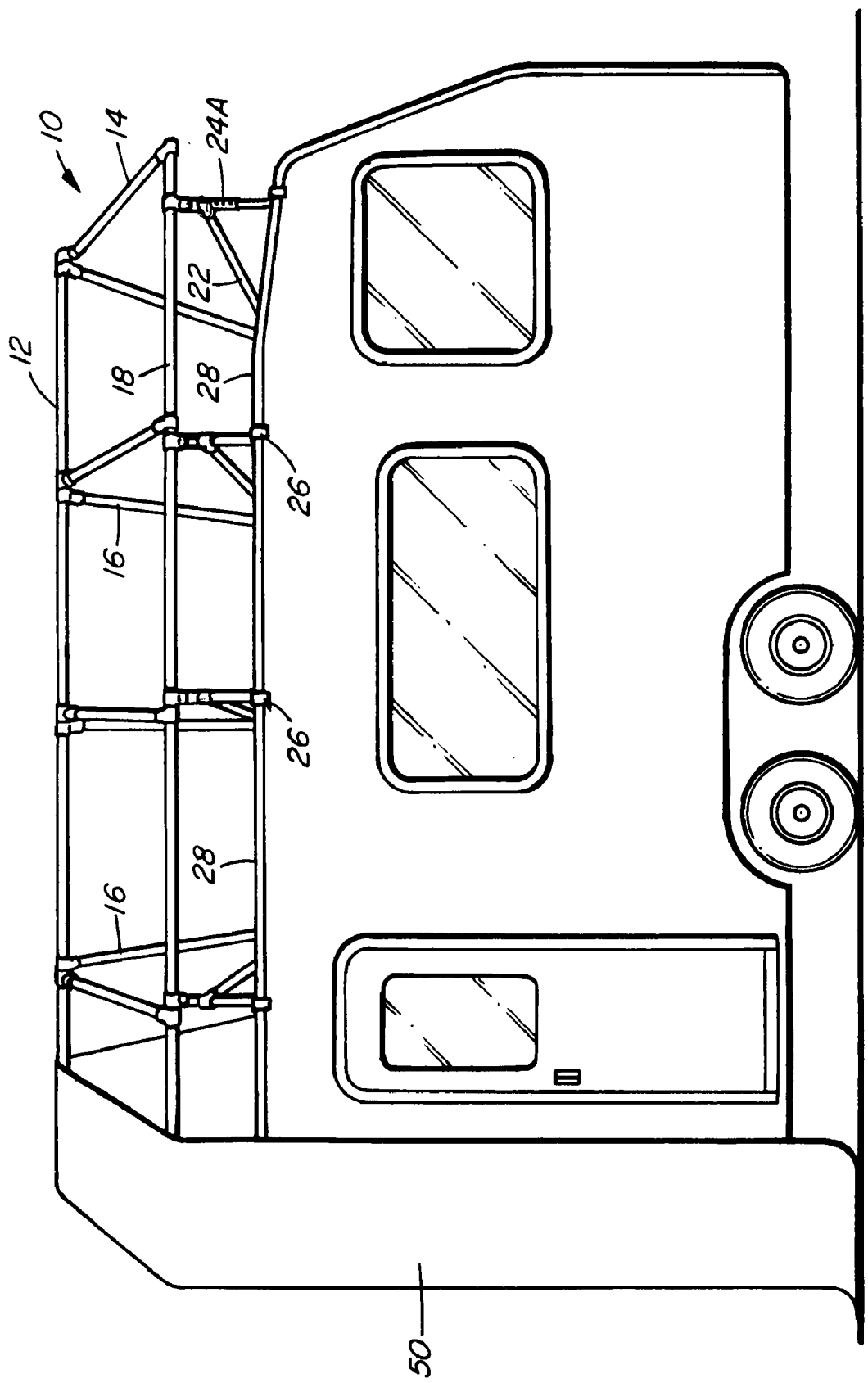
FIG. 3 is a view of a roof frame mounted onto an RV, with a portion of a cover also shown covering a portion of the roof frame and RV.

Legs 24 are preferably provided with downward facing L-shaped flanges 26. When installing frame 10 onto an RV (as shown in FIG. 3) is it preferable for each flange to grip the top corner edge 28 of the RV. Flanges 26 may be supplied with a layer of high-density rubber to protect the surfaces of the RV.

It will be appreciated that in operation, frame 10 is placed onto an RV and adjusted to a width consistent with the width of the RV so that the flanges on the legs on each opposite side of the frame grip opposing top corner edges of the RV. The width of frame 10 is adjusted by moving the horizontal members 18, 20 together and apart.

The adjustability of the width of frame 10 is a function of the adjustability of the length of pole members 22 and the rotatability of rafter members 14, 16 about ridge pole member 12 and horizontal members 18, 20. It will be appreciated that as horizontal members 18, 20 are moved towards one another (to accommodate a narrower RV), ridge pole member 12 moves upwardly and a steeper roof structure is achieved. As horizontal members 18, 20 are moved apart from one another (to accommodate a wider RV), the roof structure becomes more shallow and ridge pole member 12 moves downwardly. However steep the roof, though, a peaked roof structure is maintained.

It will also be appreciated that once the roof frame is extended to a width suitable for a particular RV (i.e. when the leg flanges grip the edges of the top of the RV), the length of pole members 22 should be fixed to fix the width of the frame. Again, any suitable fixing means may be employed, but if enough distinct narrow increments are provided in a typical push-button and hole configuration as shown in the Figures, that system should provide enough adjustability for the frame.

As shown in FIG. 3, some RV's do not have completely flat roofs. In FIG. 3, for example, an RV is shown having a roof with a large flat generally horizontal portion but also having a downwardly sloping front portion. To accommodate this, one or more of legs 24 may be provided with adjustability, conveniently also with a push-button and hole configuration, as notated 24A in FIG. 3. Accordingly, legs of different lengths can be employed as necessary.

Figure 2:
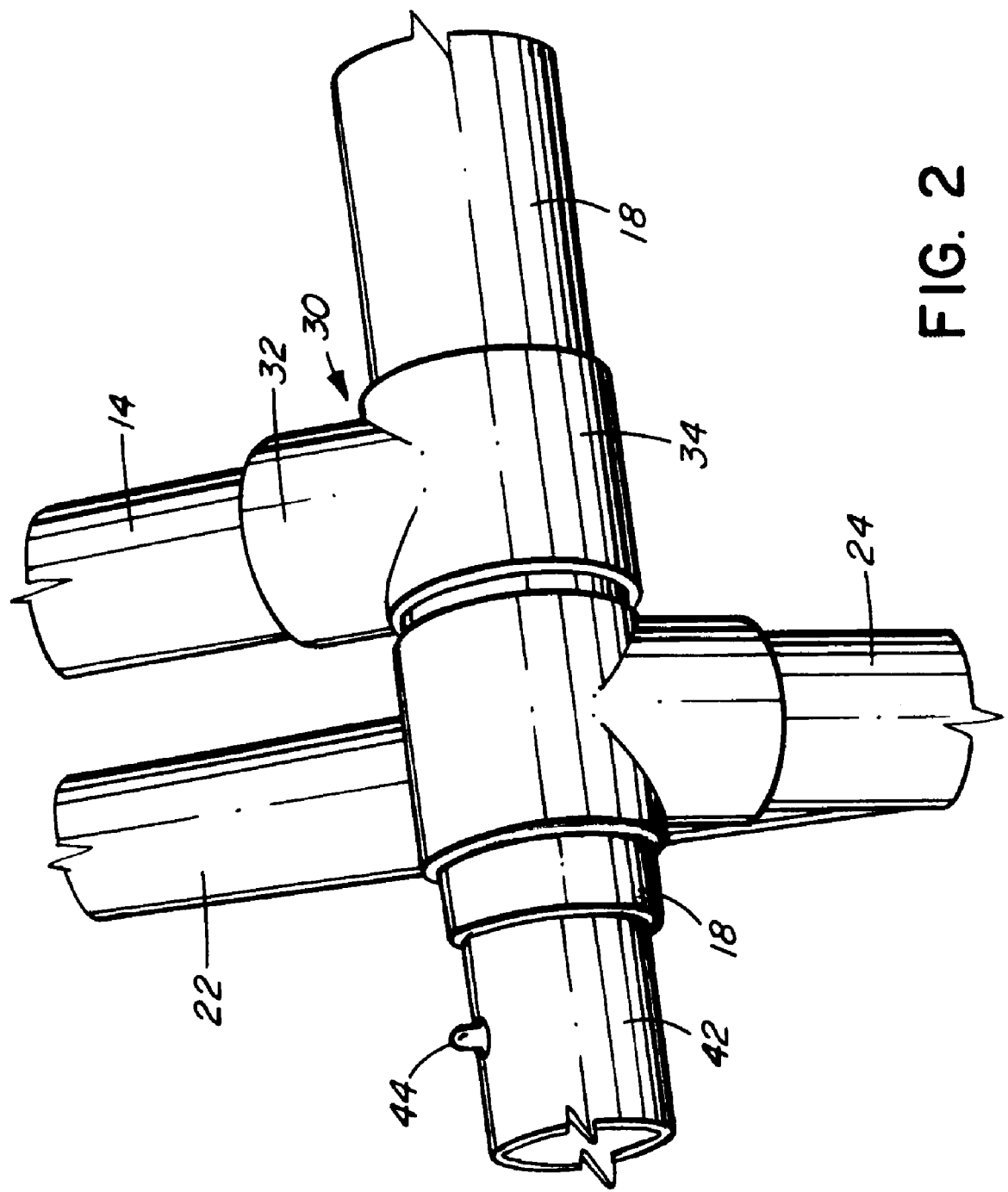
FIG. 2 is a close-up view of one portion of the roof frame shown in FIG. 1, showing in particular the nature of attachment of a rafter pole member and a leg member to a horizontal member.

FIG. 2 shows most clearly the preferred means of rotatably attaching the various members to one another. In this figure, rafter member 14 is attached to horizontal pole member 18. This figure shows a generally T-shaped coupler 30 attached to the bottom end of rafter member 14. Coupler 30 has 2 portions, a collar portion 32 which is placed onto the end of member 14, and a sleeve portion 34 which is sized to accommodate pole 18 (it has an inner diameter slightly larger than the outer diameter of pole 18). The cavities of collar portion 32 and sleeve portion 34 of coupler 30 are generally perpendicular. FIG. 2 also shows leg 24 attached to horizontal pole member 18 in much the same fashion, although it is not necessary for leg 24 to be rotatably attached to horizontal pole member 18. However, it is believed that it is preferable for leg 24 to be attached rotatably.

Figure 4:
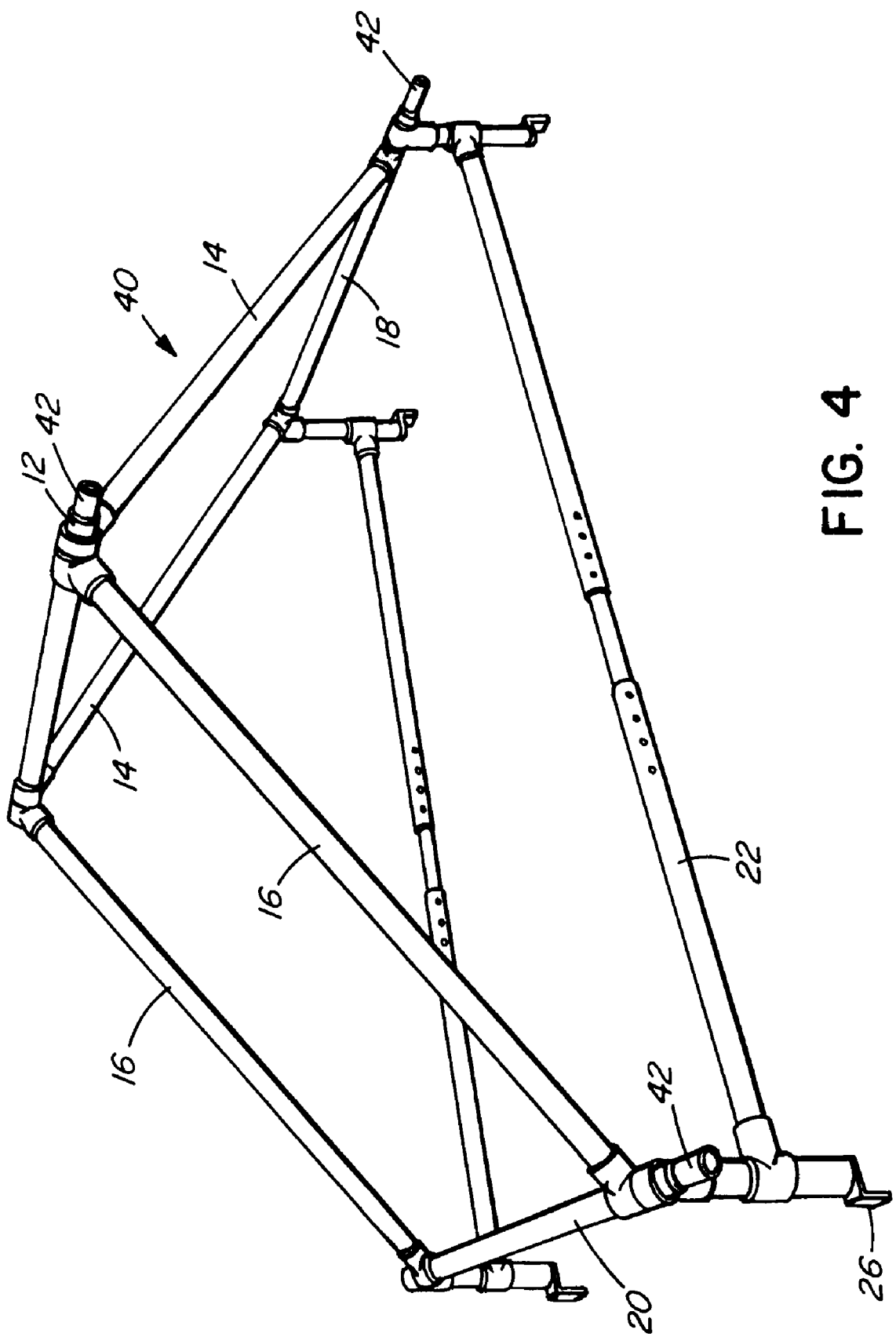
FIG. 4 shows a modular portion of a sectional roof frame which can be removably attached to other such modular portions to make a roof frame having a preferred length.

In a preferred embodiment, the roof frame is provided in modular sections 40 as illustrated in FIG. 4, two or more of which may be attached to one another to form a complete frame. This aids in installing the frame onto the roof of the RV, since the sections can be lifted and installed one at a time. Also, RV's are of different lengths and providing modular sections of the frame 10 allows different numbers of sections to be provided in a kit, for example, which is tailored to an RV of a particular length. Extra sections can be purchased if one obtains a longer RV. Also, a section can be easily replaced if it is damaged, avoiding the need to replace the entire frame.

In the roof section 40 illustrated in FIG. 4, there are two rafter members 14 and two rafter members 16, and the section is expected to have a length of approximately 4 feet. Sections 40 can be attached to one another end-to-end with any suitable means, but it is contemplated that one such attachment system might consist of a pipe 42 contained within one or more of ridge pole member 12 and horizontal members 18, 20 which acts as a pin to join adjacent sections together by aligning together adjacent ridge pole members and horizontal members. One such pipe 42 is shown in detail FIG. 2, and this particular pipe is shown with a push-button 44 which can be employed together with a hole in member 12, 18 or 20 to fix pipe 42 within member 12, 18 or 20.

The cover system of the invention includes both frame 10 and a cover 50 (shown in FIG. 5) which can be draped overtop the frame 10 once frame 10 is installed onto an RV. Cover 50 may extend over the entire length of frame 10 and extends at least partially down the height of the RV. In a preferred embodiment the cover 10 extends nearly to the ground, covering all of the RV. Cover 50 may be provided with straps 52 to allow the cover to be pulled tight underneath the RV and secured. Cover 50 may also be provided with one or more zippers 54 to aid in installation of the cover onto the frame and the RV.

Figure 5:
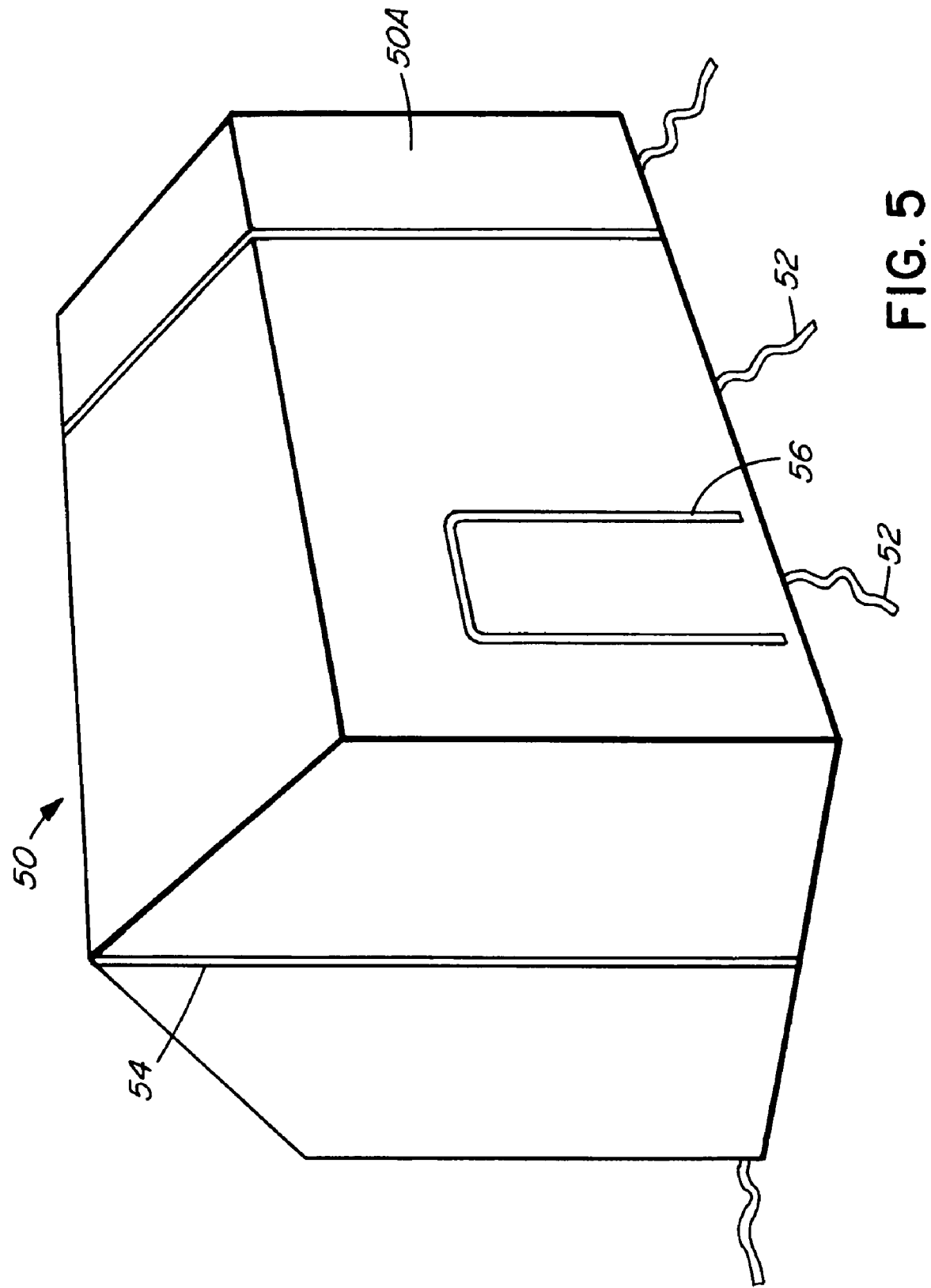
FIG. 5 shows the cover portion of the invention as placed onto the frame shown in FIG. 1 and an RV.

Moreover, certain sections of cover 50 can be provided with zippers which allow interior access to the RV (for example, in the area of a door of the RV) without requiring the removal of the cover 50 in its entirety. In FIG. 5, such a "door zipper" is notated 56. As is the case with frame section 40 described earlier, the cover or a portion thereof might be provided in separate sections 50A which can be zippered together along their seams. This can extend the length of cover 50 to match the length of frame 10. Also, in this manner a damaged section 50A of cover 50 can be replaced without needing to replace the entirety of cover 50.

It will be appreciated by those skilled in the art that the frame should be made of lightweight materials such as aluminum or a plastic such as PVC (just as examples). The cover should be made from a strong, but preferably light, water resistant or water-impermeable, but breathable, material.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A roof frame for mounting on top of an RV, comprising:
   (a) a ridge pole member;
   (b) a first plurality of rafter members rotatably mounted on said ridge pole member at a first end and extending downwardly and outwardly from said ridge pole member in a first lateral direction;
   (c) a second plurality of rafter members rotatably mounted on said ridge pole member at a first end and extending downwardly and outwardly from said ridge pole member in an opposite lateral direction from said first plurality of rafter members;
   (d) said first plurality of rafter members each rotatably attached at a second end to a first horizontal pole member;
   (e) said second plurality of rafter members each rotatably attached at a second end to a second horizontal pole member; and
   (f) said first and second horizontal pole members being movable toward and apart from one another.

2. The roof frame of claim 1 wherein said first and second horizontal pole members are attached together with one or more tie beam pole members of adjustable length.

3. The roof frame of claim 2 wherein said tie beam pole members are attached directly to said first and second horizontal pole members.

4. The roof frame of claim 3 wherein said tie beam pole members are rotatably attached to said first and second horizontal pole members.

5. The roof frame of claim 2 wherein said tie beam pole members are attached to legs extending downwardly from each of said first and second horizontal pole members.

6. A roof frame section comprising the roof frame of claim 1 wherein there are two first rafter members and two second rafter members.

7. The roof frame of claim 2 wherein the tie beam pole members comprise a first pipe and a second pipe of smaller diameter inserted therein in a telescoping manner.

8. The roof frame of claim 2 further comprising a plurality of legs extending downwardly from each one of said first and second horizontal pole members.

9. The roof frame of claim 8 wherein one or more of said legs has an adjustable length.

10. The roof frame of claim 8 wherein each leg has on one end a flange for engaging the top corner of the roof of an RV.

11. The roof frame of claim 2 wherein the ridge pole member and the first and second horizontal members are pipes and the rafter members are provided with couplers at their attached ends, said couplers having sleeves engaging said pipes.

12. A roof frame comprising a plurality of roof frame sections as claimed in claim 6, attached to one another.

13. The roof frame of claim 2 wherein the ridge pole member, the rafter members, the horizontal members and the tie beam members are made from either aluminum or plastic.

14. A cover system for use on a recreational vehicle comprising:
   the roof frame of claim 2; and
   a cover comprising:
   (a) two vertical triangular-shaped end portions for covering the ends of said frame; and
   (b) two rectangular-shaped portions for covering the sides of the frame and extending downwardly from said ridge pole member to the top edge of the RV.

15. The cover system of claim 14 further comprising four wall portions extending downwardly from said end portions and side portions, which cover at least a portion of the walls of the RV.

16. The cover system of claim 15 wherein the cover is made up of two or more sections provided with zippers along their edges for attachment to one another.

17. The cover system of claim 15 further comprising one or more zippers and one or more straps for securing the cover.

18. The cover system of claim 15 further comprising one or more zippers to enable a user to gain entry into the RV without having to remove the cover from the RV.

* * * * *